United States Patent
Kumar

(10) Patent No.: US 9,965,515 B2
(45) Date of Patent: May 8, 2018

(54) METHOD AND DEVICE FOR CACHE MANAGEMENT

(71) Applicant: SAP SE, Walldorf (DE)

(72) Inventor: Dinesh Kumar, Calicut (IN)

(73) Assignee: SAP SE, Walldorf (DE)

(*) Notice: Subject to any disclaimer, the term of this patent is extended or adjusted under 35 U.S.C. 154(b) by 202 days.

(21) Appl. No.: 15/054,831

(22) Filed: Feb. 26, 2016

(65) Prior Publication Data

US 2017/0249310 A1    Aug. 31, 2017

(51) Int. Cl.
*G06F 17/30* (2006.01)
*G06F 12/12* (2016.01)
*H04L 29/08* (2006.01)
*G06F 12/08* (2016.01)
*G06F 12/0813* (2016.01)
*G06F 12/0891* (2016.01)

(52) U.S. Cl.
CPC ...... *G06F 17/3048* (2013.01); *G06F 12/0813* (2013.01); *G06F 12/0891* (2013.01); *G06F 12/12* (2013.01); *H04L 67/1097* (2013.01); *H04L 69/329* (2013.01); *G06F 2212/154* (2013.01); *G06F 2212/60* (2013.01); *G06F 2212/62* (2013.01); *G06F 2212/69* (2013.01)

(58) Field of Classification Search
CPC .......... G06F 17/3048; G06F 17/30575; G06F 17/30902; H04L 67/10; H04L 67/1097; H04L 67/329
USPC ........................................................ 709/213
See application file for complete search history.

(56) References Cited

U.S. PATENT DOCUMENTS

| | | | |
|---|---|---|---|
| 2003/0115420 A1* | 6/2003 | Tsirigotis | G06F 12/123 711/133 |
| 2004/0128346 A1* | 7/2004 | Melamed | G06F 17/30902 709/203 |
| 2005/0149914 A1* | 7/2005 | Krapf | G06F 9/4428 717/136 |
| 2008/0046655 A1* | 2/2008 | Bhanoo | G06F 17/30902 711/133 |
| 2014/0033185 A1* | 1/2014 | Schreter | G06F 17/30575 717/140 |
| 2015/0006608 A1* | 1/2015 | Eberlein | H04L 67/1097 709/202 |

OTHER PUBLICATIONS

Unknown, "Specifying How Long Objects Stay in a CloudFront Edge Cache (Expiration)", Feb. 2015, Amazon CloudFront, https://web.archive.org/web/20150226223338/http://docs.aws.amazon.com/AmazonCloudFront/latest/DeveloperGuide/Expiration.html.*

* cited by examiner

*Primary Examiner* — Ruolei Zong
(74) *Attorney, Agent, or Firm* — Jones Day

(57) ABSTRACT

A method, software and device for managing a cache service layer of an online solution is described. The online solution includes a database, at least one client, a cache service layer having a plurality of nodes which are interconnected to each other and provide processing and caching power for the cache service layer, and the cache manager. The method comprises reading in a business object from the database; assigning, using a cache manager, the business object to a business object group on a first node of the cache service layer; determining, by the cache manager, the effective probability of cache expiration of the business object group; and setting an expiration time for the business object group based on the determination of the effective probability of cache expiration of the business object group.

37 Claims, 5 Drawing Sheets

METHOD AND DEVICE FOR CACHE MANAGEMENT

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

Recently, many businesses have implemented online solutions to address their needs and expand the means through which such businesses offer their products and services to their customers. At the same time, there are an ever increasing number of channels (e.g., the web, mobile, etc.) through which such businesses can interact with their customers. Many online solutions need the ability to scale in order to respond to an ever-increasing number of requests from multiple channels. Even for such systems, high performance and fast responsiveness is desired.

DETAILED DESCRIPTION

Figure 1:
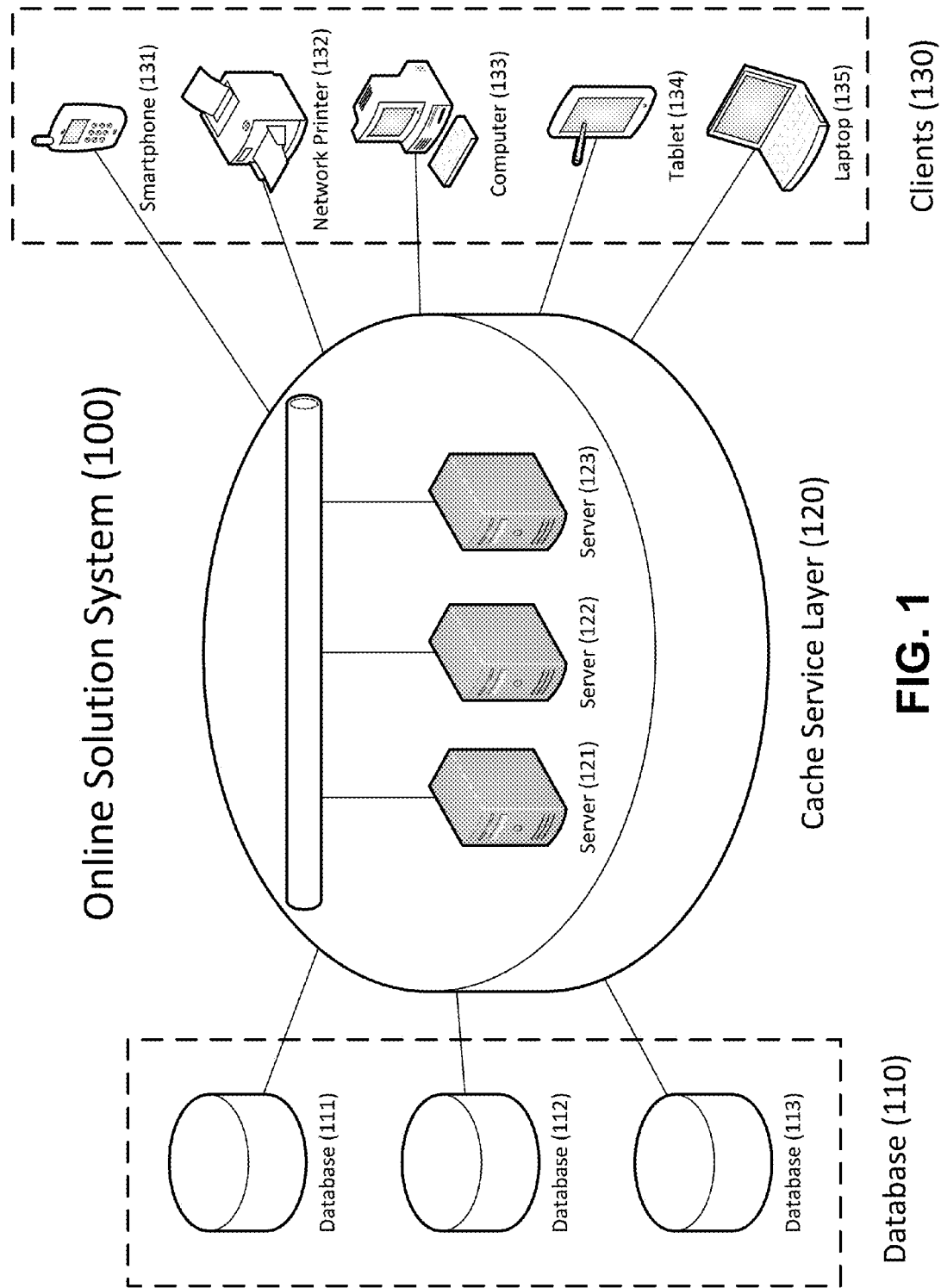
FIG. 1 illustrates an online solution system including a cache service layer according to an example embodiment.

Generally, businesses store the data pertinent to their online solutions in one or more databases. However, given the colossal size of such databases and given that oftentimes such databases are not local to the businesses' networks, data retrieval from the databases can be time consuming and their responsiveness can be unreliable. As a result, data expected to be accessed is often cached, sometimes in a cache service layer. A cache service layer is generally responsible for caching data (e.g., in the form of objects) in main memory and can be distributed across nodes (e.g., servers) in a network. Data retrieval from a cache service layer is generally much faster and more responsive than from a database. While it is desirable to store as much data as possible in the cache service layer, cost and storage size constraints limit the amount of data that can be stored in the layer. Hence, the cache service layer needs to constantly replace its content stored in memory to ensure efficient and optimized operation of the layer. At the same time, given the increasing number of the users which exploit online solutions, the cache service layer needs to be able to handle an enormous number of data requests from one or more applications, a number which can easily exceed millions. Thus, cache management techniques have become crucial to achieve high performance, responsiveness and efficient use of the memory in the cache service layer.

In accordance with the present invention, methods and systems for managing cache are provided. Overall, management of cache can include, for example, cache allocation, request routing and cache operations, cache re-allocation, and cache expiration policies. The present invention is described herein in terms of a cache service layer, although the inventions described herein can be applied to cache systems in general.

In one example embodiment, a cache service layer is responsible for caching business objects in main memory. A "business object" may be, for example, an object representation of data that needs to be processed or sent to an application (e.g., web or mobile). Applications use these objects and may perform CRUD (i.e., create, read, update, and delete) operations on them. For example, a bank can provide its customers with a consumer banking application. This application can have a user interface which displays the fund transfers made by a user between his accounts. Here, "transfer" and "account" can be two types of business objects. The user's account can have a number of business objects of each type associated with it. While using a consumer banking application for example, the user can request these objects, in response to which the application would fetch these business objects. After receiving these objects, a user interface displays appropriate information.

With respect to cache allocation, various groups can be defined (e.g., dynamically or statically) to which new business objects can be assigned. These groups create an awareness of associations between related business objects for the cache service layer. In the cache-routing operation, the cache service layer determines whether the local node, which is tasked with processing a request, caches the business object group related to the request. If the local node does not cache the business object group, the cache service layer processes the request by either transferring the request to the remote node to execute the request, or by copying, for a limited time, the business object group to the local node. For cache re-allocation, to reduce congestion in the network, e.g., business object groups stored in one node may be moved to a different node from which they are frequently accessed. The exemplary system may also include cache expiration policies, which, for example, sets business objects associated with invalid IDs or business objects having a lower effective probability to expire.

FIG. 1 illustrates an online solution system including a cache service layer according to an example embodiment. The online solution system 100 comprises a database 110, a cache service layer 120, clients 130, and a network which couples the database 110 and the clients 130 to the cache service layer 120.

The database 110 can include one or a plurality of databases. In this example embodiment, database 110 includes three databases 111-113. The databases can comprise any combination of one or more of a relational database, a multi-dimensional database, an in-memory facility, an object database, an Extensible Markup Language (XML) document, flat files, or any other data storage system that supports structured or unstructured data. Such databases may be distributed among several different entities.

The cache service layer 120 can be a distributed cache system across a plurality of nodes, e.g., shown here as servers, each of which is configured to contribute to the cache service layer 120's processing and caching power. In this example embodiment, there are three servers 121-123. The servers 121-123 can comprise any combination of one or more of cloud-based or on-premise resources and can be exposed, accessed, etc. via one or more networks. The clients 130 can include devices such as for example any combination of one or more of a desktop computer 133, a notebook computer, a laptop computer 135, a tablet 134, a smartphone 131, a wearable device, a network printer 132, etc. The network can be a local network or a global network such as the internet.

Object Groups

In accordance with the example embodiment, objects (e.g., business objects) may be associated or grouped with one another in object groups (e.g., business object groups) by, for example, a cache manager. Business objects may be associated with one or more business groups, which may depend on the context in which they are accessed. Of course, some business objects may not be assigned to any group at all. In any event, these business groups provide a way for cache manager to make the cache service layer aware of how objects are related to one another, and may include rules, conditions or definitions. Moreover, by using the object groups, the cache service layer can preserve locality of related business objects.

In an example embodiment, a business object group can be homogenous, for example, comprised of the same type of business objects (e.g., all "product" business objects). Alternatively, a business object group can be heterogeneous, for example, comprised of different types of business objects (e.g., "account" business object and "User" business objects).

Business objects can be formed either in a static fashion or in a dynamic fashion.

Static Business Object Groups

A static business object group can be defined using a declarative code, which specifies information about the business object group along with code indicating the properties or attributes. Similarly, a business object group can be defined using a configuration file.

For example, a configuration file can include the following:

```
<configuration>
    <BOGS>
        <BOG name="transfergroup" expiration-method="LRU">
            <BOType name="transaction" id="*"/>
            <BOType name="transfer" id="*"/>
            <BOType name="account" id="*"/>
        </BOG>
        <BOG name="favstockreviews" expiration-method="NONE">
            <BOType name="stock" id=100-3500"/>
            <BOType name="review" id="1100-4500"/>
        </BOG>
    </BOGS>
</configuration>
```

In this example, the business object group "transfergroup" describes an association between "account" business object, "transfer" business object, and "transaction" business object which may be involved together in several operations. Similarly, the business object group "faystockreviews" can include business objects which may be comprised of a subset of stock business objects and review business objects, which are viewed frequently by users.

Similarly, business objects for which cache misses are prohibitively expensive can be grouped into one static business object group (to which a longer expiration period will be assigned) and business objects for which cache misses are inexpensive can be grouped into another business object group (to which a shorter expiration period will be assigned).

Generally, static business object groups are fixed and the business object members do not change during runtime.

Dynamic Business Object Groups

In the example embodiment, dynamic business object groups can be created and managed dynamically by the cache manager.

Notifier Object

A dynamic business object group can be defined using notifier objects. Notifier objects may be included in business objects, and may provide relevant notifications and services to the cache manager when certain conditions are met. Notification objects contain code or logic which would determine at runtime, among other things, the current state of the object. Such notification and services can be used to provide information the cache manager may use to create business object groups.

For example, each time a user logs into a banking application, the application displays in a header a number of rates for different financial products (e.g., loans, bonds, etc.) which may be available only for a certain amount of time. A Notifier Object in each InvestmentProduct business object can notify the cache manager about its offer status, and thus, the cache manager can identify dynamically and manage a separate business object group of the Investment Product business objects whose rates expire at the same time. Thus, the cache manager can process the related business objects as a single unit (a business object group) and associate an appropriate cache expiration policy to this group during runtime.

As another example, a financial advisor may use an application to review "high-risk" accounts. An account may be a "high-risk" account if certain conditions are met, for example, if a majority of its assets are allocated to small-cap investments. The conditions are dynamic in nature and specific to an Account, particularly since the particular assets of an account can change over time. High-risk Accounts may be classified together in a single Business Object Group using a notifier object in Account business objects. In the example embodiment, the high risk accounts are likely accessed together by a financial advisor who is assigned to keep track of these accounts.

Regression Methods

In accordance with the example embodiment, the cache manager can use regression methods to identify associations between seemingly unrelated business objects, for example, in order to dynamically form business object groups.

For example, a user with "low-risk" accounts may browse and look for information regarding unrelated business objects for government bonds, fixed deposit schemes, etc. A user with "high-risk" accounts may browse and look for high return stocks most of the time. Here, a subset of multiple (seemingly) unrelated business objects, like stock business objects and InvestmentProduct business objects will be loaded, along with a subset of Account business objects, into the cache service layer for the application or platform. The cache manager may identify and group these objects into appropriate business object grounds. In this example, two business object groups may be formatted as {low-risk accounts [a subset of Account business objects], InvestmentProducts subset} and {high-risk accounts [a subset of Account business objects], stocks subset}.

As another example, users may be grouped based on their credit card spending into different interest groups, e.g., Travel, Food, Shopping, etc. Users who belong to the Travel Group might likely be spending more on travel related activities and thus might be browsing for travel related offers in a given site. Similarly, users belonging to the Food group might be looking for appropriate food offers. Here, a subset of Account business objects will be loaded along with a subset of Offer business objects into the cache service layer by the cache manager. Two dynamic business object groups may be identified as, for example, {Travel-Accounts [a subset of Account business objects], Travel Offer business objects} and {Food-Accounts [a subset of Account business objects], Food Offer business objects}.

As another example, the cache manager may recognize patterns based on the timing of when objects are loaded into the cache layer, and then allocate the business objects to business object groups accordingly. For example, a bank has only one operations office which operates during daytime and every day requests a particular set of business objects during the same timeframe. The cache manager can identify this pattern and group the set of business objects accordingly. The business object group could then be loaded into the cache service layer during, for example, the daytime, when the users in the operations office are active. The business object group could then expire, e.g., at night.

As yet another example, the cache manager may recognize associations between a ConnectionID and particular business objects, and then create business object groups based on these associations. In this example, ConnectionID may be a unique alphanumeric code which can identify a connection between an application and a user or device. These associations may assist in localizing the business objects requested by a ConnectionID. Hence, a reduction in network traffic can be achieved as localization can prevent wasteful transmission in between nodes.

For example, the user interface of an application might present to a user, e.g., a bank customer, the customer's last ten transactions, recently viewed financial products, and messages from the bank. Thus, Transaction business objects, RecentFinancialProduct business objects, and Message business objects can be associated with the appropriate ConnectionID identifying the bank customer. Thus, Transaction business objects, recent FinancialProduct business objects, Message business objects, and User business objects will be associated with the appropriate ConnectionID, and the cache manager may then create a corresponding business object group.

Cache Allocation

Figure 2:
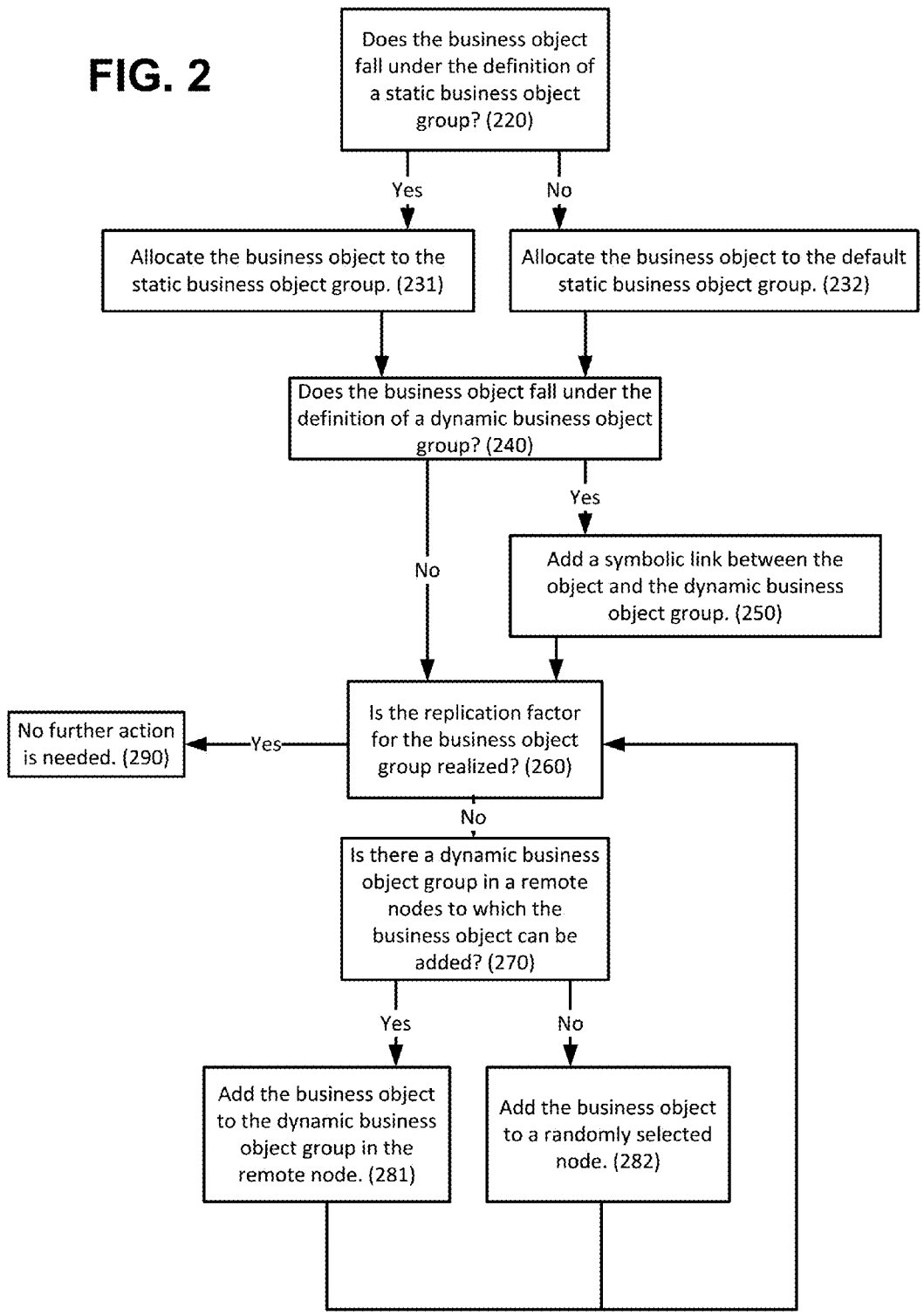
FIG. 2 illustrates a process flow for allocating a new business object retrieved from a database according to an example embodiment.

In the example embodiment, whenever the cache service layer needs to put a business object into the cache, the cache manager performs cache allocation as shown in FIG. 2. Cache allocation can be an asynchronous process.

In some platforms, any business object which is retrieved or fetched from the database and is not present in the cache service layer may be allocated (or added to the cache service layer). In some other platforms, the set of business objects which needs to be cached is pre-configured (i.e., in a configuration file). Whenever a read request, for example, is placed for any of the configured business objects, a Cache Interceptor intercepts the request, fetches the business object from the database and allocates it in the cache service layer. In these platforms, no caching may be done for business objects which are not mentioned in the configuration file.

The cache manager runs in the background and identifies the static and dynamic business object groups configured in the system. When a new business object needs to be added to the cache, i.e., for the first time, the cache manager checks for any static business object groups associated with that business object (step 220). The cache manager may first check for a definition of a static business object group that includes the business object. If a static business object group definition is found, the cache manager may then check or determine whether the static business object group associated with the definition, is already in the cache service layer. If the static business object group is present in the cache service layer, the business object may be made a part of the static business object group (step 231). If the static business object group associated with the definition is not in the cache service layer, then a static business object group may be created in the cache service layer and then the business object may be made a part of the newly created business object group (step 231).

If there are no static groups the definition of which could be associated with the new business object, the business object may be made a part of a default static business object group (step 232).

Next, the cache manager identifies the dynamic business object groups with which the new business object can be associated (step 240). In this embodiment, the cache manager tends to keep the allocation of business objects in a given business object group together in a single node. If one or more dynamic business object groups to which the new business object belongs is found, and the current business object is not part of it or them, symbolic links to the new business object is created (step 250). A symbolic link includes the address of the business object. Since the business object can already be included in the default static group, there is no need to make multiple copies of the same business object on the node including the default static group. Hence, addition of the business object to the dynamic business object group can be done in the form of a symbolic link.

After the business object is allocated to either a pre-configured static business object group or the default static business object group, the new business object is stored in cache of the local node. Assuming the cache service layer is a distributed cache system, the cache manager next determines whether the cached business object should be replicated in other nodes (i.e., remote nodes) (step 260).

In distributed cache systems, a plurality of servers hosts the cached data. A business object may be stored in cache on multiple nodes. For example, sometimes one or more nodes (e.g., servers) can be disconnected from the cache network. As a result, any data cached on the disconnected server has to be retrieved from the database, which can slowdown the data retrieval process. Oftentimes cached business objects are replicated to avoid any latency in access to the cached data when the server hosting the data is disconnected from the network.

The determination of whether the cached business object should be replicated in other nodes may be made using a replication factor. Each business object group is assigned a replication factor which indicates how many times the objects in the group have to be replicated.

If the replication factor is realized (step 260), no further replication is needed (step 290). But if the replication factor is not realized, the cache manager identifies dynamic business object groups to which the business object can belong in remote nodes (step 270). For this purpose, the cache manager may look up a dynamic business object group list, which may be a distributed data structure, and may contain the set of all dynamic business object groups in the cache service layer. It may be that there is only one list maintained for all the nodes. In an embodiment, at step 270, the cache manager does not identify static business object groups in remote nodes.

If remote dynamic business object groups are found, the cache manager replicates the business object to one or more dynamic business object groups of those nodes depending on the replication factor (step 281). This ensures that business objects are allocated to nodes which are relevant.

If remote dynamic business object groups are not found, the cache manager replicates the business object to one or more random nodes depending on the replication factor (step 282). The randomly replicated business object may be replicated in a way so that they are not a part of any particular business object groups.

Request Routing and Cache Operations

After allocating business objects to various static and dynamic groups, the cache service layer can route requests to be processed by the layer's nodes. The request may result in or translate to accessing one or more business objects. For example, a request to display in the user interface of a banking application the last ten transactions of an account may translate to a read operation of the ten Transaction business objects. Generally, requests involve read operations; however, requests can also include update or delete operations. Create operation requests are directly sent to the database, hence cache manager is not handling such requests. To enhance network efficiency and reduce wasteful transfers, it is desirable to process a request at the node which caches the business objects pertaining to the request.

Figure 3:
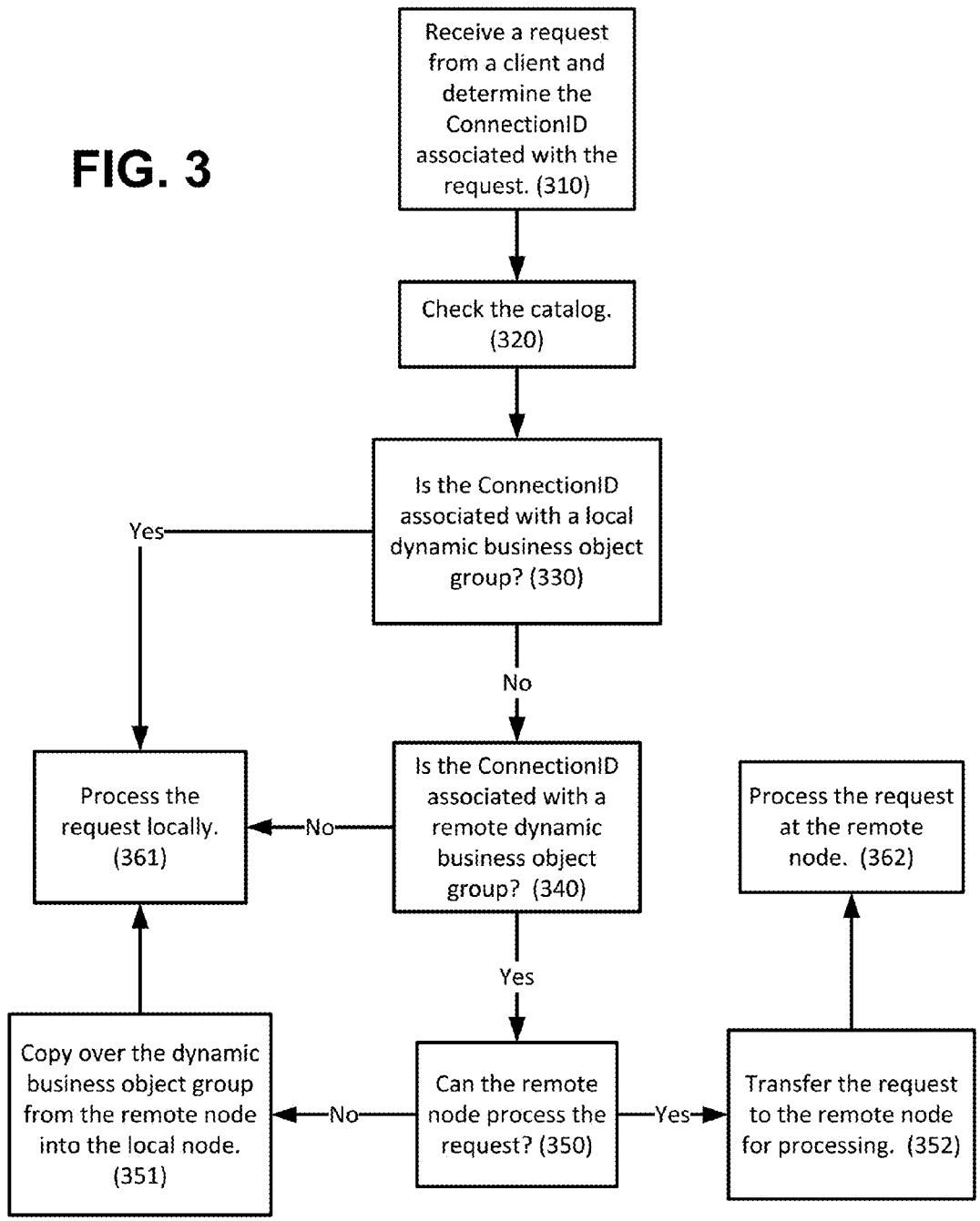
FIG. 3 illustrates a process flow for a cache-routing operation of a request according to an example embodiment.

Referring to FIG. 3, whenever the cache manager receives a request from an application, the cache manager identifies the ConnectionID associated with the request (step 310). Next, the cache manager determines the business object groups associated with the ConnectionID by checking a catalog (step 320). The catalog may be a distributed hashmap (i.e., look up table) which stores the mapping between ConnectionID and the associated business object group. Thus, catalog.get(ConnectionID) will return the associated business object group. Using the catalog, the cache manager may also identify the details of the node where the associated business object groups reside.

The cache manager first determines whether the ConnectionID is associated with a local dynamic business object group (step 330). If the node at which the dynamic business object group resides is the local node, the cache manager starts processing the request at the local node (step 361). If a dynamic business object group associated with the ConnectionID is found at a remote node, the cache manager triggers cache operations (step 350).

If no dynamic business object group associated with the ConnectionID is found (step 340), the cache manager starts processing the request in the local node (step 361). The ConnectionID may not be associated with a dynamic business object group, for example, because the business objects associated with the ConnectionID are either not associated with any dynamic groups or not cached from the database. If the business objects are not part of any dynamic groups (except the default static business object group), but are cached by the cache manager, then the processing takes place on the same node including the cached business objects. If the business objects (which are not part of any dynamic business object groups) are not cached at all, the cache service layer proceeds with a database call, and puts the business objects (retrieved from the database) in cache, and continues with processing the request on the same node.

Business object groups associated with ConnectionIDs are always dynamic in nature because ConnectionIDs are created during runtime. Thus, there is no need to check static business object groups when a ConnectionID is associated with a request.

The cache manager tries to perform co-local execution (data and execution happen in the same node) using cache operations as follows.

Co-Local Execution by Moving Execution Unit (Code)

An execution unit is a piece of code which operates on business objects. For example, consider a request to calculate the average withdrawal amount of a customer in a given month. In this case, the execution unit will be the function (say calculateAverageWithdrawal( )) in a java class which operates on a set of Transaction business objects to find the average withdrawal amount. Certain execution units cannot be moved. For example, some execution units which are inter-dependent on other modules cannot be moved or distributed to other nodes. Similarly, certain classes of execution units cannot be serialized (i.e., legacy code or uses non-serializable data structures) and thus cannot be moved.

In the example embodiment, co-local execution can be achieved by transferring the execution of a request to the node that contains the business object group. Thus, the cache manager checks whether the execution unit (code) can be moved, using an executor service technique, to the remote node containing the business object group (step 350). If this is possible, the cache manager moves the execution unit (i.e., transfers the request) to the remote node (step 352) and performs the execution at the remote note (step 362). Subsequently, the cache manager returns the result to the calling code.

Cache manager checks whether the execution unit can be moved by verifying whether the java class responsible for the execution is marked as Distributable (i.e., with Distributable annotation in the java class definition) and implements Serializable interface (i.e., any class which implements Serializable interface implies that it can be serialized and thus can be send over network).

Co-Local Execution by Moving Relevant Business Object Group (Data)

If the execution cannot be moved, for example, if the business object code does not support it, then the cache manager requests the dynamic business object group at the remote node and copies it to the local node for execution (step 351). In this case, the local node caches the remote business object group in its cache for a short period of $(d_t)$, at the end of which the business object group is deleted.

The cache manager associates a recent flag with the remote business object group (which is not copied to the local node) to identify whether any of the business objects belonging to this business object group was modified (at the remote node) during the $d_t$ timespan. If a subsequent request for the same business object group is received by the local node during the $d_t$ timespan, the cache manager checks whether a recent flag is set for the requested remote business object group. If a recent flag is not set (i.e., no change was made), the cache service layer uses the cached copy of the business object group in the local node. If a recent flag is set (i.e., change was made), the cache manager again copies the changed remote business object group at the remote node to the local node and resets the recent flag.

Cache Re-Allocation

Under certain set of circumstances, the cache manager can trigger cache re-allocation processing to essentially move business object groups from one node to another. Re-allocation can reduce transfer of business objects between the nodes.

The cache manager can re-allocate a business object group when the business object group is frequently accessed by other nodes. For example, the cache manager associates a counter with business object groups which are accessed (i.e., copied) remotely by other nodes. The counter counts how often a business object group is remotely accessed by each node, some of the nodes, or a particular node in the caches service layer. Moreover, the cache manager can set up a counter threshold value for each business object group accessed remotely. If a given remote node accesses a business object group more than the threshold value, the cache manager moves (i.e., copies) the business object group to the given remote node and deletes the business object group from the local node.

Copying the business object group increases the replication factor. But when cache manager deletes the extra replica, one fewer copy of the business object group exists and thus the replication factor is maintained. Re-allocation of (moving) business object groups to nodes which access such business object groups the most can reduce data traffic over the network to a great extent.

As an example, a cache service layer is provided which includes five nodes. A business object group is stored in node 1, node 2, and node 3, complying with a replication factor of 2. If remote accesses made by node 4 become greater than the configured threshold value, cache manager copies the business object group to node 4. In this case, the replication factor increases to 3. Hence in the next step, cache manager may delete the replica business group in any one of node 1, node 2 or node 3 so that there are only 2 replica business object groups present in the cache service layer.

The cache manager can re-allocate the cache content of a node when the node is being disconnected from the layer. Thus, all of the contents (including business objects and business object groups) of the node have to be re-allocated to other nodes. The cache manager can re-allocate each business object similar to allocation of new business objects discussed above.

The cache manager can re-allocate a business object group when an association between a business object and the business object group changes. When there is an association change, the cache manager identifies the new association and moves the business object to the appropriate business object group, which can be located on another node.

The cache manager can re-allocate a business object when replication factor of the cache service layer is modified. The cache service layer replicates the business objects affected by the change similar to replication of new business objects according to example embodiments of the present disclosure. Hence, related business objects will be replicated to the same business object groups in the same nodes. Moreover, to the extent possible, business object groups having common business objects can be replicated to the same remote nodes. Therefore, "wild replication" of business objects is avoided.

When there is a change in the number of nodes in the cache service layer or a replication factor changes (e.g., for a business object group), a large amount of replica data may need to be transferred over the network. In order to avoid network congestion, in the example embodiment, the cache manager uses a sliding-window technique. According to the technique, the cache manager first sends a small portion of the data to be transferred and waits for an acknowledgment. Once the cache manager receives the acknowledgment, for the next transfer, the cache manager slightly increases the amount of data (i.e., the window-size). If network congestion occurs or there is a delay in the acknowledgment from the receiving node, the cache manager reduces the window-size over the next transfer. The cache manager continues to reduce the window-size until response time reaches agreed-upon limits. By using the sliding-window technique, network congestion is avoided when large data replication is needed over the network. Hence, better performance results and fewer cache failures occur.

Figure 4:
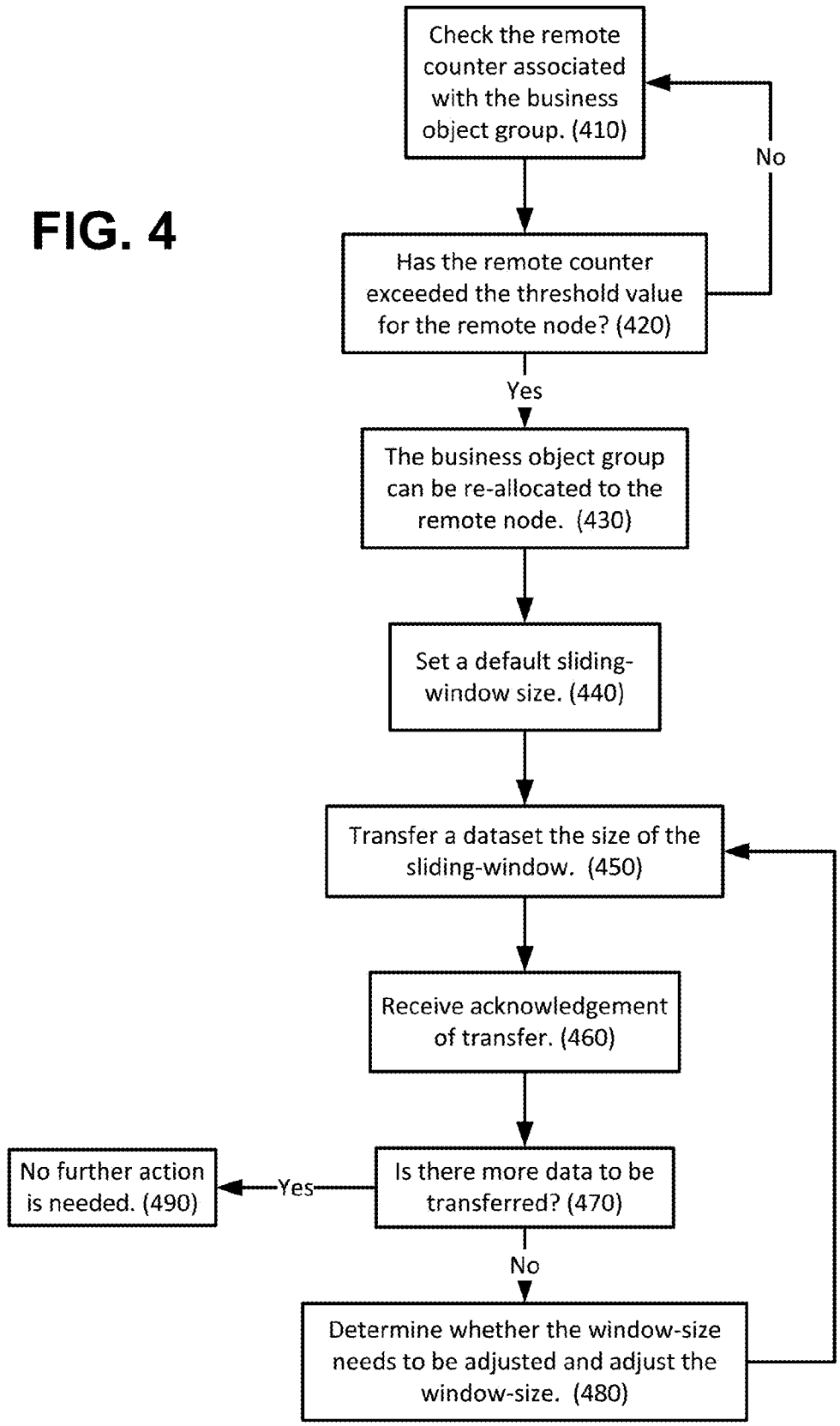
FIG. 4 illustrates a process flow for cache re-allocation of a business object group according to an example embodiment.

FIG. 4 illustrates a process flow for cache re-allocation of a business object group according to an example embodiment. This process flow determines whether a business object group can be re-allocated and transfers the business object group to a remote node if the business object group can be re-allocated. At step 410, the cache manager checks the remote counter associated with the business object group, and at step 420, the manager determines whether the remote counter has exceeded the threshold value for a remote node. If the remote counter has not exceeded the threshold value, the manager returns to step 410, at which it continues to check the remote counter.

Otherwise, the manager proceeds to step 430, at which it decides that the business object group can be re-allocated to the remote node which accessed it a number of times more than the threshold value. At step 440, the manager sets a sliding-window size, which can be a default sliding-window size. Determination of the default sliding-window size is beyond the scope of the present disclosure, and one of ordinary skill in the art can make this determination.

At step 450, the manager transfers a subset of the data, the size of which is determined by the sliding-window, and at step 460, the manager receives an acknowledgement from the remote node receiving the subset. At step 470, the manager has to determine if there is more data to be transferred to the remote node. If there is no more data to be transferred, the re-allocation process proceeds to step 490, which concludes the re-allocation process.

If there is more data to be transferred, the manager proceeds to step 480, at which it determines whether to adjust the sliding-window size. This determination can be based on how long it took for the manager to receive the acknowledgement from the remote node, or whether the transfer caused congestion in the system. The manager can also adjust the sliding-window size at this step based on the determination that the sliding-window size needs to be adjusted. The manager can continue with the transfer of remainder of the data at step 450. This cycle will be continued so long as there is data to be transferred. Once all the data is transferred, the manager can proceed to step 490, at which the data re-allocation will be concluded.

Cache Expiration

The cache manager can apply a cache expiration policy to business objects stored in the cache service layer. By using the expiration policy, the cache manager can discard business objects, for example, during regularly scheduled intervals, or when there is not enough space to perform a put (store) operation to the cache service layer. The cache manager may apply the cache expiration policy asynchronously in the background.

The cache manager maintains a list of invalidated or expired ConnectionIDs at any given point in time. The cache manager is configured to scan for business objects or business object groups associated with these ConnectionIDs. If a business object or a business object group is associated with an expired ConnectionID, it can be marked as expired (and can be deleted) in the local node and the remote nodes which include a replica of the business object or business object group. Removal of the remote replicas can be done by sending a cache-invalidate message to the corresponding node.

Business objects can be deleted or marked for expiry using notifier objects. Notifier objects are defined in business objects and can inform the cache manager whether a business object is expired. Business objects which are expired can be identified by defining isExpired( ) in their notifier object. isExpired( ) can contain the necessary logic identifying whether a business object is expired. An expired business object can be deleted by the cache manager.

For example, in a banking application, certain temporary data are recorded using transient transaction business objects. However, once the transaction is concluded (or aborted), these business objects will not be needed again and can be discarded. Notifier objects defined for these transient transaction business objects can be marked isExpired( ) upon completion of the transaction, and the notifier objects communicate this expiration to the cache manager. The cache manager can then delete the expired business objects. isExpired( ) is a method defined in the notifier object. In this case, when notifierobject.isExpired( ), the method defined for these transient transaction business objects is executed, and it will return a value of true.

As yet another example, a Boolean method can be used to identify expired business objects. Such business object methods can be parameterized (using attributes) and using the Boolean method they can be set to expire. The cache manager can identify the Boolean methods during start-up using AOP (aspect-oriented programming) and can create appropriate pointcuts to identify the return value of the method during normal execution. When any of the workflows call such methods, the result will be captured by the pointcut defined for the same. This highly optimizes the time taken for expiration processing, as it is not necessary to call this method explicitly to identify the result.

Effective Probability of Cache Expiration

Figure 5:
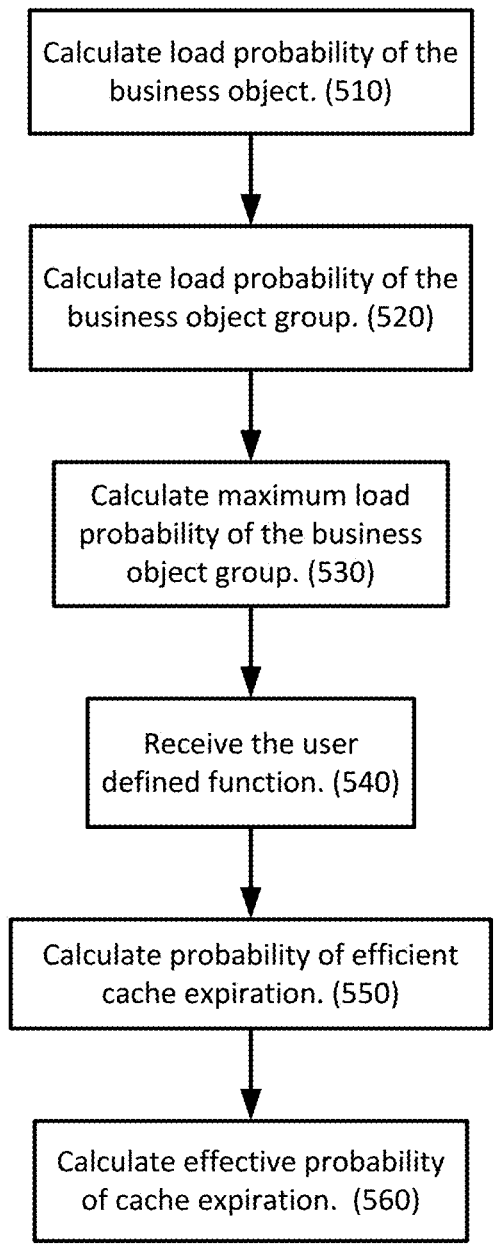
FIG. 5 illustrates a process flow for calculation of effective probability of cache expiration.

In an example embodiment, effective probability of cache expiration may be used as the expiration policy. FIG. 5 illustrates a process flow for calculation of effective probability of cache expiration.

Load Probability of a Business Object

Load probability of a business object $P_m(t)$ may be defined as the probability of loading a business object at time t (step 510). For example, the table below may identify load patterns for three business objects 1, 2, and 3 during a ten-day period starting at day 1 and ending at day 10. If an "X" is marked under a column designated for a business object for a given day, the business object was loaded on the given day.

|  | $BO_1$ | $BO_2$ | $BO_3$ |
|---|---|---|---|
| Day 1 | X |  |  |
| Day 2 |  | X |  |
| Day 3 |  |  |  |
| Day 4 |  | X |  |
| Day 5 | X | X |  |
| Day 6 |  |  | X |
| Day 7 | X | X |  |
| Day 8 |  |  |  |
| Day 9 |  |  |  |
| Day 10 |  |  |  |

In this example, the load probability of business objects 1, 2, and 3 are 3/10, 4/10 and 1/10 respectively.

Load Probability of a Business Object Group

Load probability of a business object group $P_{bog}(t)$ may be defined as the probability of loading a business object group at time t (step 520). Generally, business objects assigned to the same business object group are related or associated to one another. Due to this association, it is likely that a business object will be loaded whenever the associated business objects are loaded. Thus, load probability of a business object group can help in identifying the probability with which related business objects of a given business object group will be used.

For example, in the above table, business objects 1, 2, and 3 belong to a business object group A. The load probability of business object group A may be calculated as the ratio of the number of days (or samples) on which at least one or more of the business objects were loaded from the business object group A to the total number of days (or samples). Here, the load probability of business object group A is 6/10, because at least one or more of the business objects in business object group A were loaded in 6 different days over the 10 days identified.

In another example embodiment, the load probability of a business object group is calculated as the ratio of the number of days (or samples) on which at least one or more of the business objects other than the current business object were loaded from this business object group to the total number of days (or samples). Here, using this definition of load probability for business object group A and using the business object 1 as the current business object, the load probability is 5/10. This is because no other business object other than business object 1 was loaded on Day 1. Hence, Day 1 is excluded in counting the number of days on which at least one or more of the business objects other than the current business object were loaded from business object group A.

Maximum Load Probability of a Business Object Group

A business object might be a part of several business object groups. The load probability of each of these business object groups to which the business object belongs can be calculated. Hence, a maximum probability of a business object group $P_{bog-max}(t)$ at time t can be determined (step 530).

User Defined Function

A user defined function F(z) which can take into account various probabilities and parameters can be provided for the cache manager (step 540). The user defined function can be a function, method, or code defined by the administrator of the cache manager.

For example, a user defined function $F(P_m(t), P_{bog-max}(t))=((x*P_m(t))+((1-x)*P_{bog-max}(t)))$ can be used for calculating probability of efficient cache expiration. Here, x is a real number which can have values in the range of [0-1], and can provide the relative weight of each one of the probabilities included in the user defined function. The value of "x" is set by the administrator of the cache manager and can be modified.

As an example, x can be set to 0.8. In this example, using the table provided above and considering business object 1 as the current business object, $F(P_m(t), P_{bog-max}(t))=((0.8*0.3)+((1-0.8)*0.6))=0.36$.

An administrator can provide additional parameters in this function apart from $P_m(t)$ and $P_{bog-max}(t)$. A user defined function helps the administrator to factor in the parameters according to the administrator's needs and also to factor in external parameters of the administrator's choice.

Probability of Efficient Cache Expiration

The probability of efficient cache expiration is derived from the user defined function as follows: $P_e=1-F(z)$ (step 550). For instance, in the above example, in which F(z) was equal to 0.36, the probability of efficient cache expiration $P_e$ may be 0.64. In this example, The probability of efficient cache expiration may explicate that with a probability of 64%, this business object (here business object 1) may be expired.

Effective Probability of Cache Expiration

Each cache manager may be provided with a pre-configured method of business object cache expiration. For example, a cache manger can use Least Recently Used ("LRU") method as a pre-configured method for business object cache expiration. The effective probability of cache expiration $P_{ef}$ is calculated as the product of the result of pre-configured cache expiration method and probability of efficient cache expiration $P_e$ (step 560). Cache manager applies this probabilistic cache expiration algorithm to the pre-configured method of business object cache expiration in the system.

For example, a pre-configured method such as LRU of business object cache expiration may be defined in the system. In such cases, the cache manager can enhance the configured expiration (or eviction) method using a probabilistic cache expiration algorithm. In the above example for business object 1, a pre-configured LRU may infer the result as 1 or true (implying that business object 1 can be expired). Thus, $P_{ef}$ will be 1*0.64=0.64.

As another example, in case the pre-configured method returns a real value, e.g., 0.2, (implying with 20% probability the item can be expired), effective probability of cache expiration is calculated as the maximum of pre-configured cache expiration method's result and $P_e$.

Once $P_{ef}$ is identified, cache manager proceeds to the next step and compares $P_{ef}$ with a pre-configured value $P_{min}$ which denotes the minimum probability needed to mark or identify a business object as to be expired. If $P_{ef} > P_{min}$, cache manager identifies the business object as to be expired. On the other hand, if $P_{ef} < P_{min}$, cache manager proceeds to the next business object in the list.

For example, $P_{min}$ is set to 0.6 by the administrator. In the above example, where $P_{ef} = 0.64$, business object 1 may be marked as to be expired because $P_{ef}(0.64) > P_{min}(0.6)$.

When a business object is being expired, the cache manager identifies inner objects marked for cascading expiration and marks the corresponding business objects for expiration as well. For example, if order business object is being expired, then cache manager will identify orderitems list inside order business object and mark corresponding orderitem business objects for expiration as well.

Since replication factors and expiration policies are assigned to business object groups, a scenario might come up in which a business object is included in multiple business object groups, and hence, is assigned multiple replication factors or expiration policies. The cache manager is configured to resolve such conflicts. For example, the cache manager may consider the replication factor or expiration policy of the business object group defined first in the configuration file. Alternatively, the cache manager may randomly pick one of the replication factors or expiration policies assigned to business object.

Various system elements, components, exchanges, or interactions that were presented above may incorporate aspects of inter alia one or more Application Programming Interfaces (APIs), one or more standards-based artifacts (such as for example JSON, XML, etc.), one or more custom artifacts, etc.

In the above description, numerous specific details are set forth to provide a thorough understanding of embodiments. One skilled in the relevant art will recognize, however, that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

What is claimed is:

1. A method for managing a cache service layer of an online solution including a database, at least one client, a cache service layer having a plurality of nodes which are interconnected to each other and provide processing and caching power for the cache service layer, and a cache manager, the database and the at least one client are connected to the cache service layer using a network, the method comprising:
   reading in a business object from the database;
   assigning, using the cache manager, the business object to a business object group on a first node of the cache service layer;
   determining, by the cache manager, the effective probability of cache expiration of the business object group; and
   setting an expiration time for the business object group based on the determination of the effective probability of cache expiration of the business object group.

2. The method of claim 1, wherein the business object group is a static business object group which does not change during runtime.

3. The method of claim 1, wherein the business object group is a dynamic business object group which is determined during runtime.

4. The method of claim 3, wherein the dynamic business object group is defined using at least one of a notifier object and a regression method.

5. The method of claim 1, further comprising:
receiving, at the first node of the cache service layer, a request from the at least one client, the request being related to the business object; and
processing the request at the first node of the cache service layer.

6. The method of claim 1, further comprising:
receiving, at a second node of the cache service layer, a request from the at least one client, the request being related to the business object;
determining, using the cache manager, which one of the first node and the second node to process the request;
processing the request at the determined node which is one of the first node and the second node of the cache service layer.

7. The method of claim 6, wherein in determining which one of the first node and the second node to process the request, if:
the first node can support the request, the request is transferred to the first node at which the first node processes the request; and
the first node cannot support the request, the business object group is copied over to the second node for a limited period of time and the second node processes the request.

8. The method of claim 7, wherein the first node cannot support the request, if at least one of:
the request depends on modules which cannot be distributed to the first node; and
an execution unit in the second node cannot be serialized.

9. The method of claim 7, further comprising:
re-allocating the business object group to the second node responsive to a determination that the business object group has been copied over to the second node more than a pre-determined threshold value.

10. The method of claim 9, wherein in re-allocating the business object group, the cache manager uses a sliding-window technique.

11. The method of claim 1, further comprising:
assigning the business object group with a replication factor which indicates how many times the business object in the business object group has to be replicated on nodes other than the first node.

12. The method of 11, further comprising:
re-allocating the business object group to the second node responsive to a determination by the cache manager that the first node is being disconnected from the cache service layer.

13. The method of claim 12, wherein in re-allocating the business object group, the cache manager uses a sliding-window technique.

14. The method of claim 1, wherein in determining the effective probability of cache expiration, the cache manager:
calculates a load probability of the business object;
calculates a load probability of the business object group;
calculates a maximum load probability of the business object group;
uses a user defined function to calculate a probability of efficient cache expiration; and
calculates an efficient probability of cache expiration.

15. The method of claim 14, wherein the load probability of the business object is the probability of loading the business object at a point in time.

16. The method of claim 14, wherein the load probability of the business object group is the probability of loading the business object group at a point in time.

17. The method of claim 14, wherein the effective probability of cache expiration is a product of a result of a pre-configured cache expiration method and the probability of efficient cache expiration.

18. The method of claim 1, wherein in determining the effective probability of cache expiration, the cache manager determines whether the at least one client is associated with a ConnectionID which is invalid, responsive to which the business object group will be set to expire by the cache manager.

19. A non-transitory computer-readable medium on which are stored instructions that are executable by a processor and that, when executed by the processor, cause the processor to perform a method for managing a cache service layer of an online solution including a database, at least one client, a cache service layer having a plurality of nodes which are interconnected to each other and provide processing and caching power for the cache service layer, and a cache manager, the database and the at least one client are connected to the cache service layer using a network, the method comprising:
reading in a business object from the database;
assigning, using the cache manager, the business object to a business object group on a first node of the cache service layer;
determining, by the cache manager, the effective probability of cache expiration of the business object group; and
setting an expiration time for the business object group based on the determination of the effective probability of cache expiration of the business object group.

20. A system for managing a cache service layer of an online solution including a database, at least one client, a cache service layer having a plurality of nodes which are interconnected to each other and provide processing and caching power for the cache service layer, and a cache manager, the database and the at least one client are connected to the cache service layer using a network, the system comprising:
at least one data processor; and
memory storing instructions which, when executed by the at least one data processor, result in operations comprising:
reading in a business object from the database;
assigning, using the cache manager, the business object to a business object group on a first node of the cache service layer;
determining, by the cache manager, the effective probability of cache expiration of the business object group; and
setting an expiration time for the business object group based on the determination of the effective probability of cache expiration of the business object group.

21. The system of claim 20, wherein the business object group is a static business object group which does not change during runtime.

22. The system of claim 20, wherein the business object group is a dynamic business object group which is determined during runtime.

23. The system of claim 22, wherein the dynamic business object group is defined using at least one of a notifier object and a regression method.

24. The system of claim 20, further comprising:
receiving, at the first node of the cache service layer, a request from the at least one client, the request being related to the business object; and
processing the request at the first node of the cache service layer.

25. The system of claim 20, wherein the operations further comprise:
receiving, at a second node of the cache service layer, a request from the at least one client, the request being related to the business object;
determining, using the cache manager, which one of the first node and the second node to process the request;
processing the request at the determined node which is one of the first node and the second node of the cache service layer.

26. The system of claim 25, wherein in determining which one of the first node and the second node to process the request, if:
the first node can support the request, the request is transferred to the first node at which the first node processes the request; and
the first node cannot support the request, the business object group is copied over to the second node for a limited period of time and the second node processes the request.

27. The system of claim 26, wherein the first node cannot support the request, if at least one of:
the request depends on modules which cannot be distributed to the first node; and
an execution unit in the second node cannot be serialized.

28. The system of claim 26, wherein the operations further comprise:
re-allocating the business object group to the second node responsive to a determination that the business object group has been copied over to the second node more than a pre-determined threshold value.

29. The system of claim 28, wherein in re-allocating the business object group, the cache manager uses a sliding-window technique.

30. The system of claim 20, wherein the operations further comprise:
assigning the business object group with a replication factor which indicates how many times the business object in the business object group has to be replicated on nodes other than the first node.

31. The system of 31, wherein the operations further comprise:
re-allocating the business object group to the second node responsive to a determination by the cache manager that the first node is being disconnected from the cache service layer.

32. The system of claim 31, wherein in re-allocating the business object group, the cache manager uses a sliding-window technique.

33. The system of claim 30, wherein in determining the effective probability of cache expiration, the cache manager:
calculates a load probability of the business object;
calculates a load probability of the business object group;
calculates a maximum load probability of the business object group;
uses a user defined function to calculate a probability of efficient cache expiration; and
calculates an efficient probability of cache expiration.

34. The system of claim 33, wherein the load probability of the business object is the probability of loading the business object at a point in time.

35. The system of claim 33, wherein the load probability of the business object group is the probability of loading the business object group at a point in time.

36. The system of claim 33, wherein the effective probability of cache expiration is a product of a result of a pre-configured cache expiration method and the probability of efficient cache expiration.

37. The system of claim 20, wherein in determining the effective probability of cache expiration, the cache manager determines whether the at least one client is associated with a ConnectionID which is invalid, responsive to which the business object group will be set to expire by the cache manager.

* * * * *